United States Patent [19]
Namekawa

[11] Patent Number: 4,809,316
[45] Date of Patent: Feb. 28, 1989

[54] METHOD FOR IDENTIFYING OPERATION MODES OF AN ANTITHEFT SYSTEM

[75] Inventor: Makoto Namekawa, Iwaki, Japan

[73] Assignee: Alpine Electronics, Japan

[21] Appl. No.: 96,790

[22] Filed: Sep. 11, 1987

Related U.S. Application Data

[63] Continuation of Ser. No. 881,075, Jul. 2, 1986, abandoned.

[30] Foreign Application Priority Data

Jul. 9, 1985 [JP] Japan .................................. 60-150642

[51] Int. Cl.⁴ ............................................... H01Q 7/04
[52] U.S. Cl. ....................................... 379/58; 235/385;
340/825.31; 340/539; 340/825.35; 379/63;
379/44
[58] Field of Search ......................... 379/58, 56, 63, 44,
379/59; 340/825.31, 825.35, 539, 531, 63;
455/54, 56; 235/385, 375

[56] References Cited

U.S. PATENT DOCUMENTS

| | | | |
|---|---|---|---|
| 3,427,402 | 2/1969 | Stokes | 179/5 P |
| 3,787,624 | 1/1974 | Spitalny et al. | 179/4 R X |
| 4,009,375 | 2/1977 | White et al. | 455/54 |
| 4,394,540 | 7/1983 | Willis et al. | 379/107 |
| 4,469,917 | 9/1984 | Shelley | 379/107 X |
| 4,511,887 | 4/1985 | Fiore | 179/5 R X |
| 4,558,181 | 10/1985 | Blanchard et al. | 379/107 |
| 4,567,472 | 1/1986 | Shirai et al. | 340/525 |
| 4,577,182 | 3/1986 | Millsap et al. | 340/539 |
| 4,631,527 | 12/1986 | De Witt et al. | 340/539 |
| 4,651,157 | 3/1987 | Gray et al. | 342/457 |
| 4,670,746 | 6/1987 | Taniguchi et al. | 340/825.31 |
| 4,672,375 | 6/1987 | Mochida et al. | 340/825.31 |
| 4,710,745 | 12/1987 | Del Rosario | 340/63 |

FOREIGN PATENT DOCUMENTS

| | | | |
|---|---|---|---|
| 0077243 | 6/1980 | Japan | 379/58 |
| 0077248 | 6/1980 | Japan | 179/5 R |
| 0041827 | 3/1985 | Japan | 379/58 |
| 0214126 | 10/1985 | Japan | 379/63 |

Primary Examiner—Robert Lev
Attorney, Agent, or Firm—Guy W. Shoup; Paul J. Winters

[57] ABSTRACT

The identification of the status of an anti-theft system is made by using a motor vehicle telephone system and a system for preventing vehicles from thefts. First, a time is set in order to turn the telephone system to the power-on state. A time period for which the power-on state continues is also set. The telephone system is turned on at the pre-set power-on time, and the status of one or more operating modes of the anti-theft system is checked only when an incoming call arrives during the power-on state and when a predetermined ID code has been entered. With this arrangement, identification can be available from a place away from a vehicle to determine whether the vehicle is at the normal state or not. In addition, the telephone system may be set to the power-on state only at the predetermined time only for a pre-determined period of time. This additional feature reduces power consumption of batteries.

3 Claims, 3 Drawing Sheets

METHOD FOR IDENTIFYING OPERATION MODES OF AN ANTITHEFT SYSTEM

This is a continuation application from application Ser. No. 881,075 filed July 2, 1986, now abandoned.

BACKGROUND OF THE INVENTION

1. Field of the Invention

This invention relates to a method of identifying the status of an anti-theft system for motor vehicles by using an automotive telephone system.

2. Prior Art

Various types of theft-proof devices have so far been proposed to prevent motor vehicles from being stolen. When someone other than a vehicle owner tries to open a door or open a trunk door of a car provided with a theft-proof device, or otherwise gives a significant shock thereto, the device operates to buzz an alarming buzzer or to flash a head lamp.

However, conventional devices have various limitations of utility. For example, buzzing a buzzer or flashing a head lamp is effective only when someone is near the vehicle. They proved to be insufficient in case where nobody is near the vehicle or the theft occurs at night.

For this reason and others, the owner of a vehicle sometimes wants to ascertain the safety of his/her car in a parking lot or garage even if he/she is taking a tour or a business trip for many days. If the safety of his/her vehicle is ascertained, the owner will feel rested. Otherwise, the owner can take some countermeasures depending upon abnormalities ascertained.

However, it was impossible in accordance with conventional devices to identify, from a place away from a vehicle, what is happening on his/her car. In other words, remote checking as to whether or not the car is safe was not practically available in accordance with the conventional devices.

SUMMARY OF THE INVENTION

It is therefore an object of the present invention to provide a method for identifying the status of an anti-theft system which is available at a remove area to check whether a motor vehicle is in normal state or whether abnormalities are occurring in the vehicle.

In summary, the present invention comprises a system configuration wherein the time to set a motor vehicle telephone system to a power-on state and a power-off duration are pre-set, and the power for the motor vehicle telephone system is turned on at the pre-set power-on time. The status of the anti-theft system is checked when an incoming call arrives during the pre-set power-on state and when a pre-determined ID code is entered. This system configuration enables identification even from a place away from a motor vehicle as to whether the vehicle is at normal state or whether some abnormality such as theft has occurred. In addition, the vehicle telephone system may be set to the power-on state only at a predetermined time only for a pre-determined period of time, thereby reducing the watt consumption of vehicle batteries.

DETAILED DESCRIPTION OF THE INVENTION

Means to solve the problem

Figure 1:
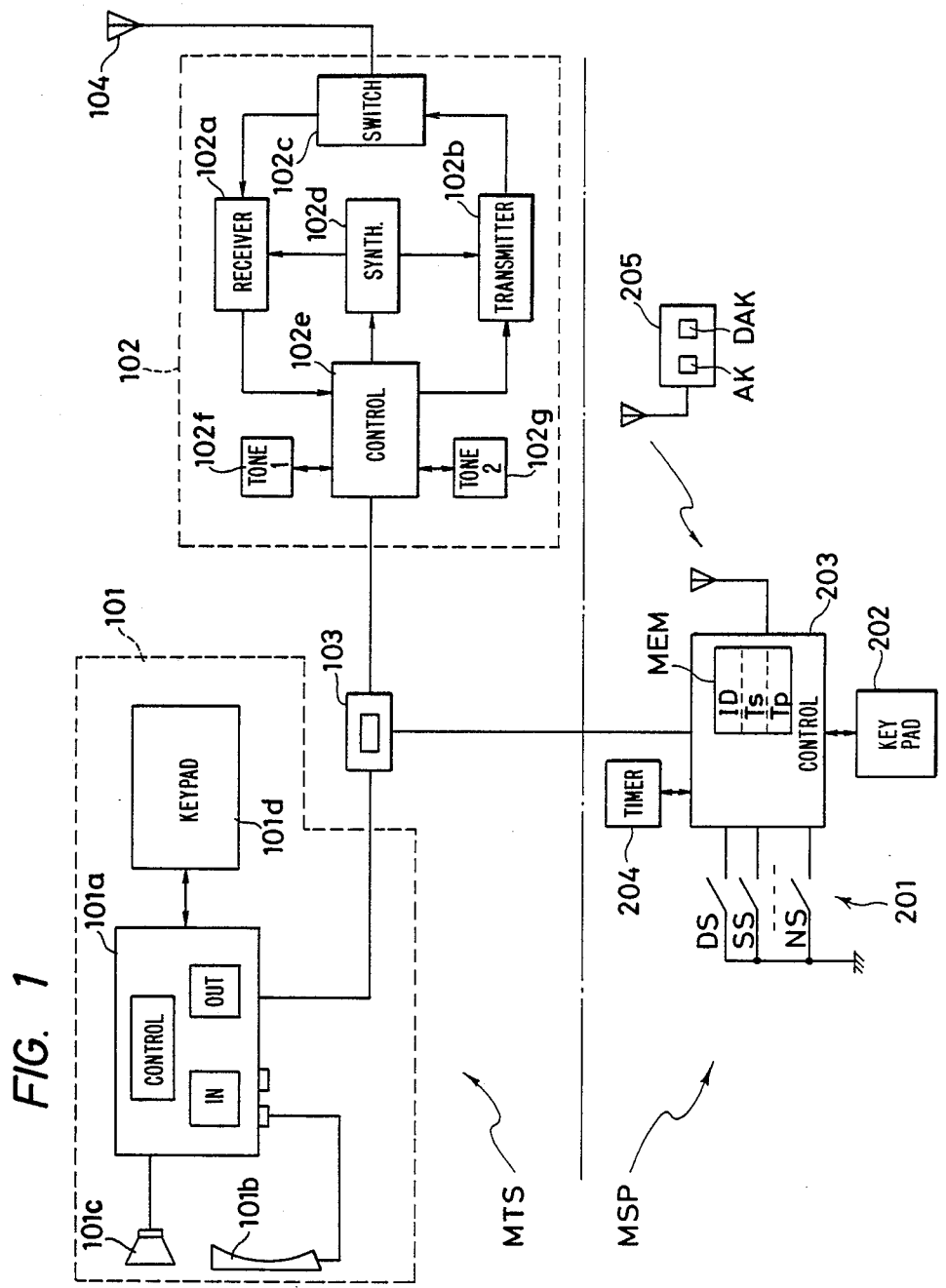
FIG. 1 is a block diagram of the system for realizing a method for an anti-theft system in accordance with the present invention.

FIG. 1 is a block diagram of the system for realizing the method for theft-prevention in accordance with the present invention.

THe MTS is a motor vehicle telephone system and the MSP is a anti-proof system.

The motor vehicle telephone system MTS comprises a control unit 101, a transceiver unit 102, a T-connector 103, and an antenna 104.

The anti-theft system MSP comprises a sensor unit 201 for detecting a theft or other abnormalities, an operating unit 202 with numeric and function keys, a control unit 203 of a microcomputer-system, a timer 204, and a remote control unit 205 as a pager for turning on/off the theft-proof function.

The control unit 101 and the transceiver unit 102 are interfaced for enabling mutual communication by means of power control lines, digital data exchange lines, voice lines, etc., and the T-connector 103 connects these lines to the control unit 203 of the anti-theft system MSP.

Function

In the present identification of the anti-theft system operation, the time Ts is pre-set into the anti-theft system MSP in order to set the telephone system MTS to the power-on state and the power-on duration Tp.

Before leaving the motor vehicle, a driver sets the anti-theft system MSP to the operating state by operating the operating unit 202 or the remote control unit 205 and sets the power for the motor vehicle telephone system to the turned-off state.

Under the above condition, when the power-on time is reached, the anti-theft system MSP sets the power for the motor vehicle telephone system to the turned-on state.

During this power turned-on state, when a call arrives at the motor vehicle telephone system, an ID code set in the anti-theft system in advance is input, and further a pre-determined code corresponding to each operation mode of the anti-theft system is input and the status of the system is confirmed to the notifiee.

Therefore, when an owner of a vehicle calls up the vehicle telephone system of the vehicle at the pre-set time, and inputs the ID code which has been stored in the anti-theft system, and inputs a code corresponding to an anti-theft operation mode, the owner is then appropriately notified of the status of the system by a recognition sound.

Examples

FIG. 1 is a block diagram of the system to realize the anti-theft status identification method of the present invention.

The MTS is a motor vehicle telephone system of a cellular system and the MSP is an anti-theft system. The cellular system is a system wherein a service area is broken down into a plurality of cells each having a radius of approximately 6.4 Km and being provided with a radio station (base station). One of the base stations which receives a radio wave from a telephone installed in a vehicle is switched successively in response to the movement of the vehicle for establishing a communication path with a notification destination.

The motor vehicle telephone system MTS comprises a control unit 101, a transceiver unit 102, a T-connector 103, and an antenna 104.

Figure 3:
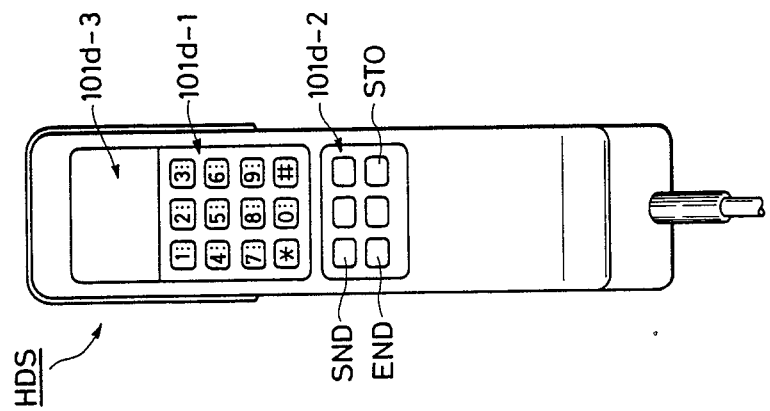
FIG. 3 is a front view of the handset.
Figure 2:
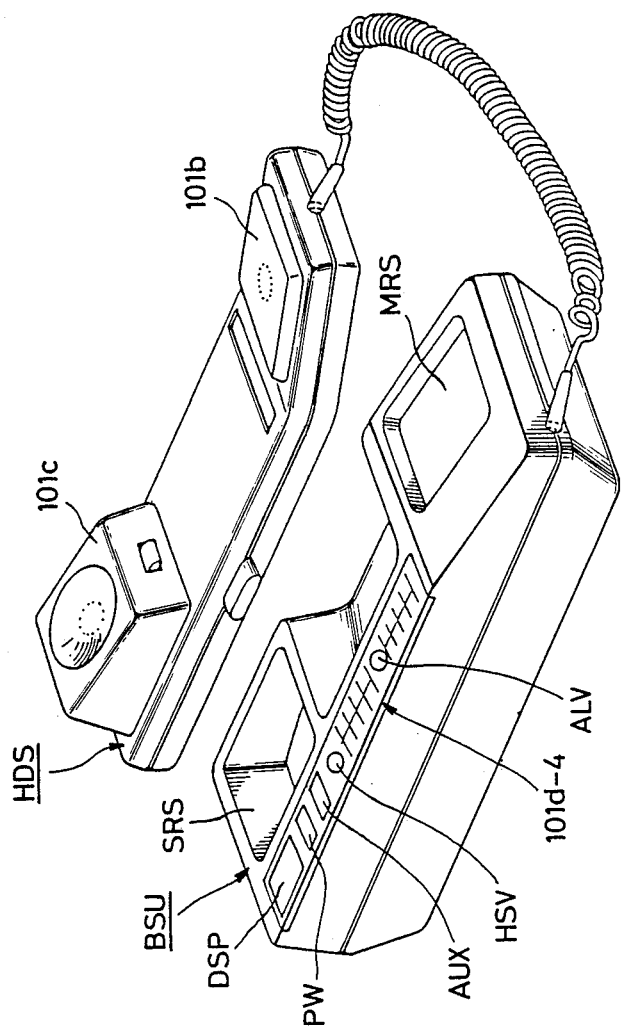
FIG. 2 is a perspective view of the control unit.

The control unit 101 is composed of a control section 101a of a computer structure, a speaker 101c, a microphone 101b, and an operating/display section 101d, which are divided mechanically into a handset HDS and a base unit BSU as shown in FIG. 2. On the back surface of the handset HDS are installed the microphone 101b and the speaker 101c. On the front surface are installed, as shown in FIG. 3, a ten-key section 101d-1 for inputting telephone numbers, a function key section 101d-2 with a send key SND, and an end key END, and a display section 101d-3 for displaying telephone numbers dialed.

The base unit BSU is provided as shown in FIG. 2 with a panel section 101d-4, a speaker rest section SRS, and a microphone rest section MRS. On the panel section 101d-4 are installed a power-on/off switch PW, an AUX switch, an volume control ALV for controlling the speaker level for a ring tone, a handset volume HSV for controlling the receiver sound volume for the handset, and a display section DSP for various displays. It is noted that the ten-key section 101d-1, the function key section 101d-2, and the display section 101d-3 of the handset HDS; and the panel section 101d-4 of the base unit BSU constitutes the operating/display section 101d shown in FIG. 1.

The transceiver unit 102 comprises a receiver section 102a, a transmitter section 102b, a switch section 102c for properly connecting the antenna 104 to the receiver section or to the transmitter section, a synthesizer 102d for generating a pre-determined frequency signal, a control section 102e, and status identifying tone generator devices 102f and 102g. The status identifying tone generator device 102f generates a normal status tone (pitz - pitz - pitz . . . , for example) while the status identifying tone generator device 102g generates an abnormal status tone (pee - pee - pee . . . , for example). It is also possible to integrate the status identifying tone generator devices 102f and 102g into one voice synthesizer which outputs normal status and abnormal status with spoken language.

The anti-theft system MSP comprises a sensor section 201 for detecting theft or abnormalities, an operating section 202 of a keyboard structure, a control unit 203 of a microcomputer, a timer 204, and a remote control unit 205 as a pager for turning on/off the theft-proof function.

The sensor unit 201 comprises a sensor DS for detecting door opening/closing, a shock sensor SS for detecting shocks exceeding a pre-determined shock value, a noise sensor NS for detecting that noise inside a vehicle has exceeded a pre-determined noise value, and a sensor for detecting opening/closing of a trunk door The operating unit 202 having ten keys and function keys is operated respectively, (a) when storing an ID code (password number) into the memory MEM of the contorl unit 203, (b) when storing the time Ts to turn on the power for the motor vehicle telephone system MTS and the power-on duration Tp into the memory MEM, (c) when making the anti-theft function of the system operate, and (d) when clearing the operation of the anti-theft function.

The ID code is input when identifying the status of the anti-theft system MSP or when resetting the alarm state of the system because of the occurrence of an abnormality.

The timer 204 starts clocking by a command from the control unit 203 when the power-on time Ts is reached, and the elapsed time t is referred to as required by the control unit 203.

The remote control unit 205 incorporates a transmit circuit and has a key KEY (referred to as an arming key) for operating the anti-theft function of the system, and a key DAK (referred to as a disarming key) for clearing the operating mode of the anti-theft function.

The control unit 101 and the transceiver unit 102 of the telephone system MTS are interfaced by means of a plurality of power control lines, digital data exchange lines and voice lines, and the T-connector 103 connects some of the lines to these control unit 203 of the anti-theft system MSP. More specifically, a total of three lines, i.e. a power control line, a data transmitting line, and a data receiving line are connected to the control unit 203 of the anti-theft system MSP.

Figure 4:
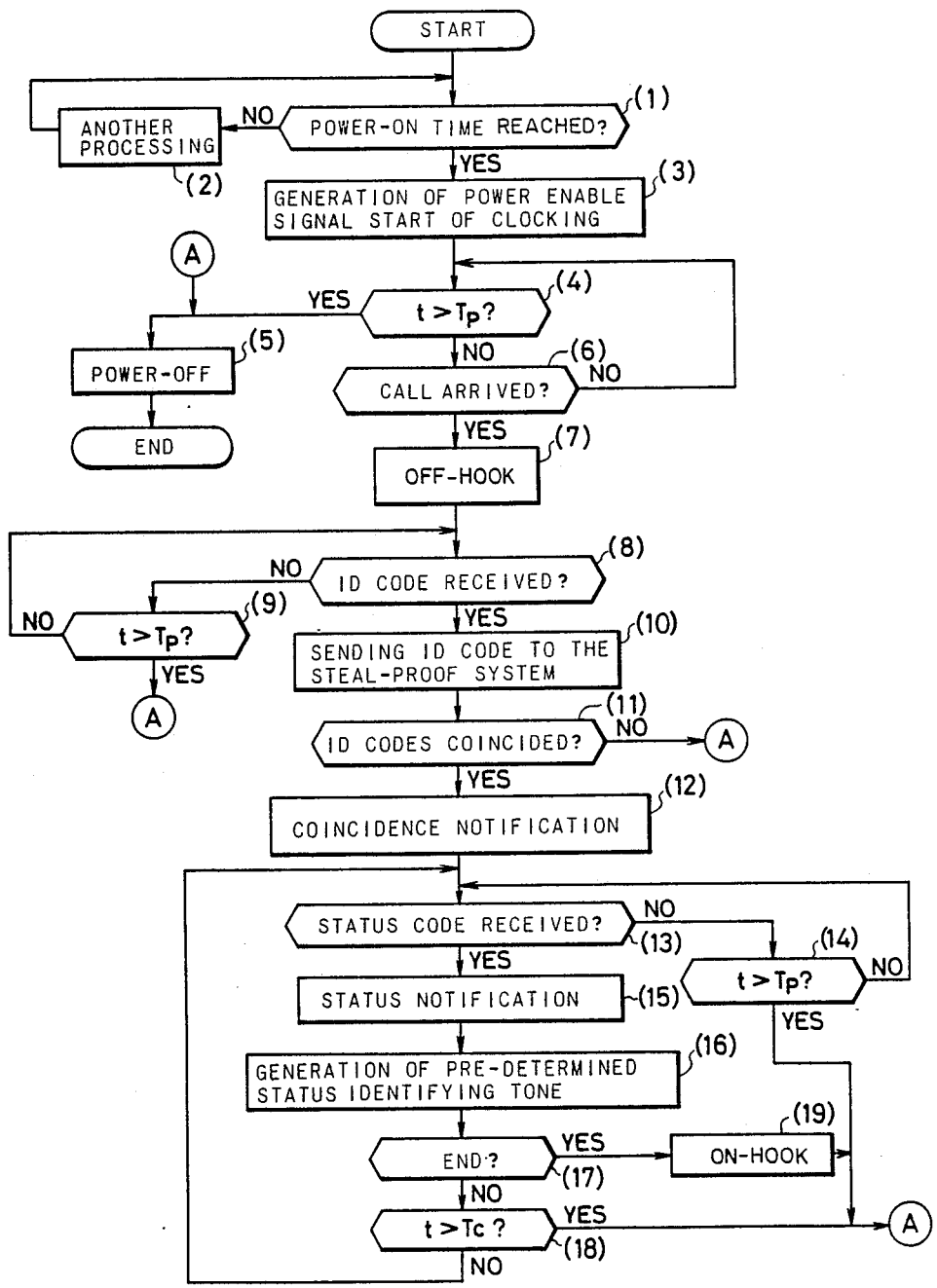
FIG. 4 is a flow chart of the processings for the present invention.

The operational steps in the anti-theft system are described as follows with reference to the flow chart in FIG. 4.

A time Ts and a power-on period Tp are set and stored into the memory MEM of the control unit 203 by operating the operating unit 202 of the anti-theft system MSP. The time Ts is to set the telephone system MTS to the power-on state. In addition, an ID code is set and stored into the memory MEM in the same way through the operating unit 202.

When the driver leaves a vehicle, he/she sets the anti-theft system MSP to the operating state by operating unit 202 or the remote control unit 205 and sets the power for the motor vehicle telephone system MTS to the turned-off state by operating the power-on/off switch PW (FIG. 2) of the motor vehicle telephone system.

(1) Under this condition, the processor of the control unit 203 of the anti-theft system checks whether the present time has reached the power-on time Ts.

(2) When the power-on time Ts has not been reached yet, the processor executes other processings.

(3) When the power-on time is reached, the control section 203 of the theft-proof system MSP outputs a power enabling signal (high level-signal) to the power control line to turn on the power for the motor vehicle telephone system MTS. The control unit 203 also instructs the timer 204 to start clocking.

(4) The processor of the control unit 203 reads out the elapsed time t from the timer 204 as required, then it discriminates between t and Tp by checking whether the elapsed time t exceeds the power-on duration Tp (i.e. t>Tp).

(5) When the relation of t>Tp is obtained, the control unit 203 sets the motor vehicle telephone system MTS to power-off state.

(6) On the other hand, in the case of t≦Tp, the control unit 203 checks, until the relation of t>Tp is obtained, whether a call command is input from the transceiver unit 102.

(7) When the control section 102e of the transceiver unit 102 in the motor vehicle telephone system MTS is accessed by a notifiee, it performs the normal incoming call processing and inputs a call command to the control unit 203 of the theft-proof system MSP. By this, the control unit 203 is caused to hook-off.

(8) Under this condition, the control unit 203 is in the wait mode until an ID code of the theft-proof system is received. It is necessary in this case to make an inquiry about the operation mode of the theft-proof system using a touch-tone telephone for sending an ID code, etc.

(9) Upon receipt of an ID code, it is checked as to whether the relation to t>Tp is obtained until it is received. It should be noted that the process skips to the step (5) when the relation to t>Tp is obtained.

(10) when an ID code is received, the control section 102e of the transceiver unit 102 inputs the ID code to the control unit 203.

(11) The processor of the control unit 203 checks whether the ID code notified from the transceiver unit coincides with the ID code stored in the memory MEM. If not, the process skips to the step (5).

(12) If the received ID code is coincident with the stored ID code, the control unit 203 notifies this coincidence to the transceiver unit 102.

(13) After this, the control unit 203 will be in the wait mode until the reception of pre-determined codes set in advance according to the operation modes of the theft-proof system. Then, the codes are as follows:

(a) Code #1 is to inquire whether the theft-proof system is in the operating mode, (b) Code #2 is to inquire whether the anti-theft system is in the non operating mode, (c) Code #3 is to inquire about the on/off state of the door sensor, and (d) Code #4 is to inquire about the on/off state of the shock sensor.

(14) If no status code is received, the control unit 203 reads out as required the elapsed time t from the timer 204 to check whether t>Tp is obtained. If obtained, the process skips to the step (5).

(15) If a status code is received, the control unit 203 decodes the received code and checks the status of the anti-theft system corresponding to the code provided to the control section 102e of the transceiver unit 102 via the transmit lines. If the received status code, for example is "#3", the control unit 203 checks the on/off state of the sensor which detects the door open/close state and outputs a code signal corresponding to the door sensor-on/off.

(16) According to the signal provided upon checking the door sensor-on/off, the control section 102e of the transceiver unit 102 makes either of the status identifying tone generator devices 102f and 102g operate in order that a sound having a tone corresponding to the door sensor-on/off status (on for abnormal off for normal) is sent to the notification destination.

(17) The control unit 203 then checks whether the end state occurred.

(18) If the end state does not occur, the control unit 203 checks whether t is larger than Tp (t>Tp). If t is larger than Tp (t>Tp), the process skips to the step (5). If t is smaller than or equal to Tp (t≦Tp), the control unit 203 will be in the wait state until the next inquiry code is received, whereupon the processes subsequent to the steps (13) are repeated.

(19) When the end state occurs in the step (17), the control unit 203 of the anti-theft system causes an on-hook state to occur. By this, the motor vehicle telephone system MTS is set immediately to the end state through the normal on-hook operation. After this, the process skips to the step (5) causing the motor vehicle telephone system to be set to the power-off state.

As thus far described, if an owner of a vehicle calls up the motor vehicle telephone system of the vehicle at the pre-set time, inputs the ID code which has been set in the anti-theft system, then inputs a code corresponding to the state of the vehicle desired to kown be confirmed, the owner is then notified by a sound corresponding to the state of the vehicle.

Although the invention has been described for the case where one power-on time Ts is used, it is to be understood that the invention is of course not limited to one power-on time.

What is claimed is:

1. A method for remotely identifying the status of an anti-theft system applicable to a motor vehicle having a telephone system and an anti-theft system, comprising:
   providing the anti-theft system with a controller unit for monitoring a plurality of sensors detecting a plurality of anti-theft conditions of the vehicle;
   connecting the controller unit of the anti-theft system to the telephone system and providing the controller unit with means for pre-setting a time for turning on the telephone system to a power-on state and a time period during which the power-on state continues;
   initially placing the telephone system in a power-off state when a notifiee for the vehicle leaves the vehicle unattended to be protected by the anti-theft system;
   turning on the telephone system with the controller unit to receive an incoming call from a notifiee at a remote location after the pre-set power-on time and during the pre-set time period; and
   operating the controller unit when receiving the incoming call during the power-on state of the telephone system to respond to any one of a plurality of inquiry codes selectively transmitted on the incoming call by issuing a status signal to the telephone system identifying the status of any one of the plurality of anti-theft conditions of the vehicle corresponding to the inquiry code, wherein the status signal is transmitted by the telephone system to the notifiee at the remote location.

2. A method for remotely identifying the status of an anti-theft system according to claim 1, further comprising:
   providing the controller unit with storage means for storing a pre-determined ID code, and comparing means for comparing the stored ID code with an ID code transmitted through the incoming call to the telephone system; and
   operating the controller unit to receive an ID code transmitted through the incoming call by the notifiee in order to determine whether the notifiee is an authorized caller before issuing the status signal identifying the anti-theft condition of the vehicle.

3. A method for remotely identifying the status of an anti-theft system according to claim 1, wherein the status signal is provided to the notifiee in a spoken language.

* * * * *

UNITED STATES PATENT AND TRADEMARK OFFICE
CERTIFICATE OF CORRECTION

PATENT NO.   :   4,809,316
DATED        :   February 28, 1989
INVENTOR(S)  :   Makoto Namekawa It is certified that error appears in the above-identified patent and that said Letters Patent is hereby corrected as shown below:

On the Title Page, Item [54] and column 1, lines 1 and 2, the title should read --METHOD FOR IDENTIFYING THE STATUS OF AN ANTITHEFT SYSTEM--.

In the Abstract:

Line 8, delete "operating modes" and insert --sensors--.

Signed and Sealed this

Twenty-seventh Day of June, 1989

Attest:

DONALD J. QUIGG

Attesting Officer

Commissioner of Patents and Trademarks